United States Patent
Inoue

(10) Patent No.: US 10,929,727 B2
(45) Date of Patent: Feb. 23, 2021

(54) IMAGE PROCESSING APPARATUS WITH COLOR REPLACEMENT WITH ACHROMATIC COLORS, AND IMAGE PROCESSING METHOD AND STORAGE MEDIUM THEREOF

(71) Applicant: CANON KABUSHIKI KAISHA, Tokyo (JP)

(72) Inventor: Takuya Inoue, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/560,799

(22) Filed: Sep. 4, 2019

(65) Prior Publication Data
US 2020/0097783 A1 Mar. 26, 2020

(30) Foreign Application Priority Data

Sep. 25, 2018 (JP) .............................. JP2018-179264

(51) Int. Cl.
*G06K 15/10* (2006.01)
*G06K 15/02* (2006.01)

(52) U.S. Cl.
CPC ..... *G06K 15/1822* (2013.01); *G06K 15/1849* (2013.01)

(58) Field of Classification Search
CPC combination set(s) only.
See application file for complete search history.

(56) References Cited

U.S. PATENT DOCUMENTS

2015/0262046 A1* 9/2015 Hayakawa ............ G06F 3/1288
358/3.24

FOREIGN PATENT DOCUMENTS

| JP | 2000-141789 | | 5/2000 |
| JP | 2017-038242 | * | 2/2017 |

OTHER PUBLICATIONS

Ichihara et al., Color universal design: the selection of four easily distinguishable colors for all color vision types, Jan. 28, 2008, SPIE 6807, Color Imaging XIII: Processing, Hardcopy, and Applications, 68070O (Year: 2008).*

* cited by examiner

*Primary Examiner* — Barbara D Reinier
(74) *Attorney, Agent, or Firm* — Venable LLP

(57) ABSTRACT

Provided is an image processing apparatus comprising: at least one controller, having at least one processor which executes instructions stored in at least one memory and/or at least one circuitry, being configured to: generate intermediate data by analyzing PDL data; generate a color conversion table based on a predetermined color conversion method; rewrite color information contained in the intermediate data by using the color conversion table; and perform rendering based on the intermediate data after the rewrite of the color information.

11 Claims, 12 Drawing Sheets

IMAGE PROCESSING APPARATUS WITH COLOR REPLACEMENT WITH ACHROMATIC COLORS, AND IMAGE PROCESSING METHOD AND STORAGE MEDIUM THEREOF

BACKGROUND OF THE INVENTION

Field of the Invention

The present invention relates to an image processing apparatus and an image processing method for performing color conversion processing, and to a storage medium.

Description of the Related Art

In a case where a printing apparatus outputs a gray scale format image of a color document expressed in an RGB format or the like, the printing apparatus usually converts the inputted RGB values into values in a gray scale by collectively using a conversion method (such as NTSC conversion) targeting all color values and outputs the converted values. Color conversion in which all colors are conversion targets (hereinafter all-color conversion) is effective for documents required to have tonality.

Here, the all-color conversion loses color information in the course of the conversion from RGB (three channels) into gray (one channel). For this reason, there is a case where a plurality of colors expressed by different RGB values (colors) are converted into the same gray value (or close gray values) by the all-color conversion, so that the chromatic difference between the plurality of colors is no longer recognizable. In particular, in an image drawn such that two colors overlap or abut each other, such as a pie chart, the boundary line between the two colors disappears. Thus, in a case where an image generated in such a manner is outputted as a black-and-white image, the distinguishability may possibly be lower than in a case where the image is outputted as a color image.

Also, individuals with color vision deficiencies may perceive colors expressed by different RGB values (colors) as the same color (or resembling colors). Thus, even in a case where a color document expressed in an RGB format or the like is outputted as a color image, the distinguishability may possibly be low such that individuals with color vision deficiencies fail to recognize the difference between colors or individuals with normal color vision and individuals with color vision deficiencies see colors differently, for example.

In view of this, Japanese Patent Laid-Open No. 2017-38242 proposes a method involving performing color conversion according to the number of colors used in the document as a method to enhance the distinguishability in the output image. In the method disclosed in Japanese Patent Laid-Open No. 2017-38242, the colors, objects, and so on used in a page are analyzed from PDL data to obtain information on the number of colors; and a color conversion table is generated on the basis of that information. Also, Japanese Patent Laid-Open No. 2000-141789 proposes a method involving performing color conversion using such a color conversion table in a case of generating a raster image processor (RIP) image from intermediate data.

However, in methods involving performing color conversion for an RIP image like the above method, the color conversion needs to be performed on a pixel-by-pixel basis, which may possibly increase the processing load.

SUMMARY OF THE INVENTION

An image processing apparatus according to the present invention comprises: at least one controller, having at least one processor which executes instructions stored in at least one memory and/or at least one circuitry, being configured to: generate intermediate data by analyzing PDL data; generate a color conversion table based on a predetermined color conversion method; rewrite color information contained in the intermediate data by using the color conversion table; and perform rendering based on the intermediate data after the rewrite of the color information.

Further features of the present invention will become apparent from the following description of exemplary embodiments with reference to the attached drawings.

DESCRIPTION OF THE EMBODIMENTS

Embodiments of the present invention will be described below with reference to the drawings. Note that the constituent elements described in the following embodiments merely represent exemplary modes of the present invention and do not limit the scope of the present invention only to those.

First Embodiment

A first embodiment will be described by taking as an example a printing control apparatus which, in executing gray scale conversion, generates intermediate data by analyzing the print data and switches the color conversion method according to the result of the analysis of the print data.

Figure 1:
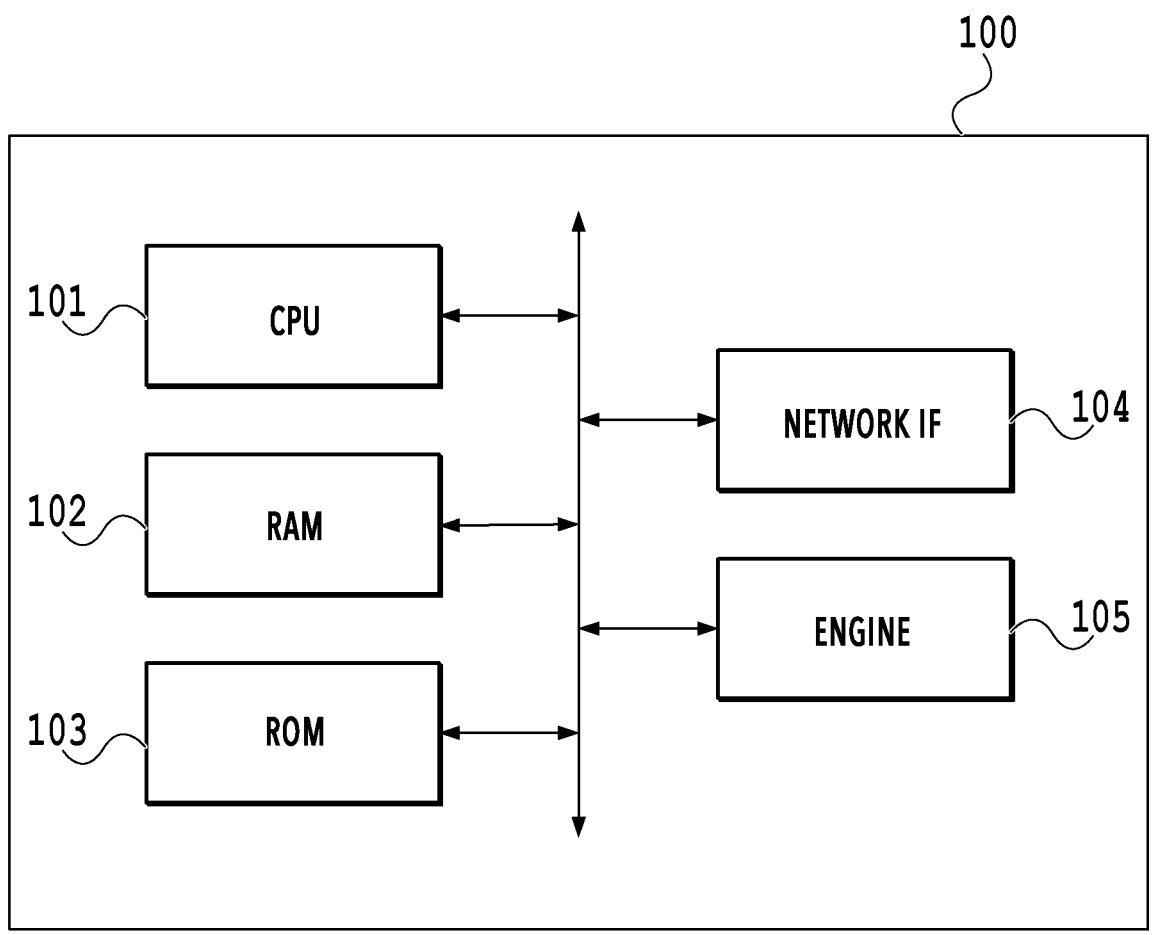
FIG. 1 is a block diagram showing an example of the hardware configuration of a printing control apparatus according to a first embodiment.

FIG. 1 is a block diagram showing an example of the hardware configuration of a printing control apparatus 100 according to the first embodiment. A CPU 101 is a central unit for control of the printing control apparatus 100. An RAM 102 is a storage device that can be accessed by the CPU 101 and, in the present embodiment, is used as a work memory for the CPU 101 to operate. An ROM 103 stores a program. The software modules shown in FIG. 2 to be mentioned later operate as a result of the CPU 101 loading this process into the RAM 102 and executing it. A network IF 104 is an interface that is connected to an external apparatus (such as a personal computer or other apparatuses) through a network and mainly receives print data. Note that page description language (PDL) data is received as the print data from the external apparatus in the present embodiment. An engine 105 is a printing engine that performs printing on a print medium (such as a paper sheet) in accordance with the PDL data interpreted by the CPU 101.

Figure 2:
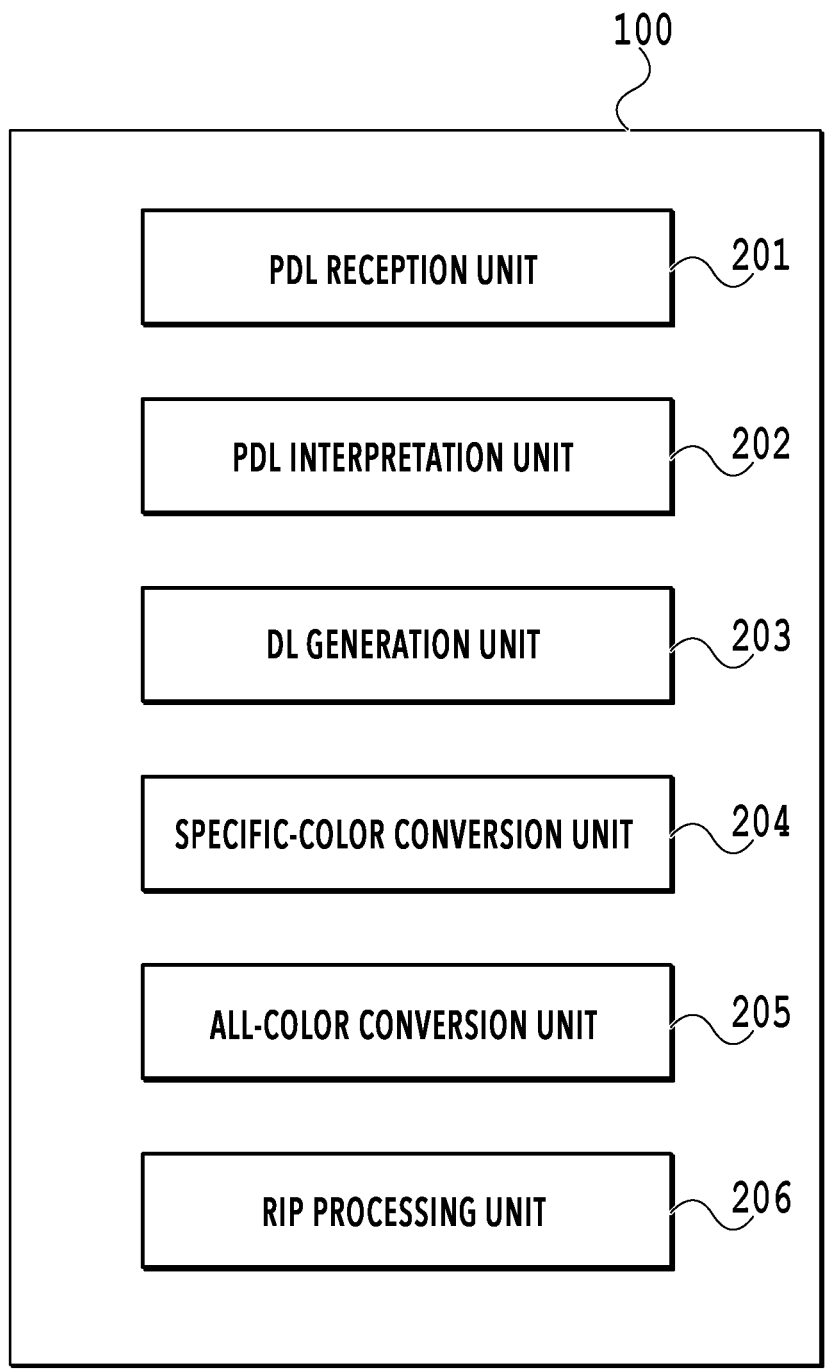
FIG. 2 is a diagram showing an example of the software configuration of the printing control apparatus.

FIG. 2 is a diagram showing an example of the software configuration of the printing control apparatus 100. As shown in FIG. 2, the printing control apparatus 100 has software modules 201 to 206. As mentioned above, these software modules operate as a result of the CPU 101 executing the program loaded in the RAM 102 from the ROM 103. Also, the operations of these software modules enable the printing control apparatus 100 to also function as an image processing apparatus.

A PDL reception unit 201 receives PDL data from the network IF 104. The received PDL data is stored in the RAM 102. Meanwhile, a case where the PDL data is received from an external apparatus through a network is exemplarily described in the present embodiment. However, the PDL data may be stored in the RAM 102 in advance. A PDL interpretation unit 202 reads out and interprets drawing commands designated in the PDL data stored in the RAM 102. The shapes and color information of objects to be drawn are determined in accordance with these drawing commands. As a result, the objects are generated.

Figure 3:
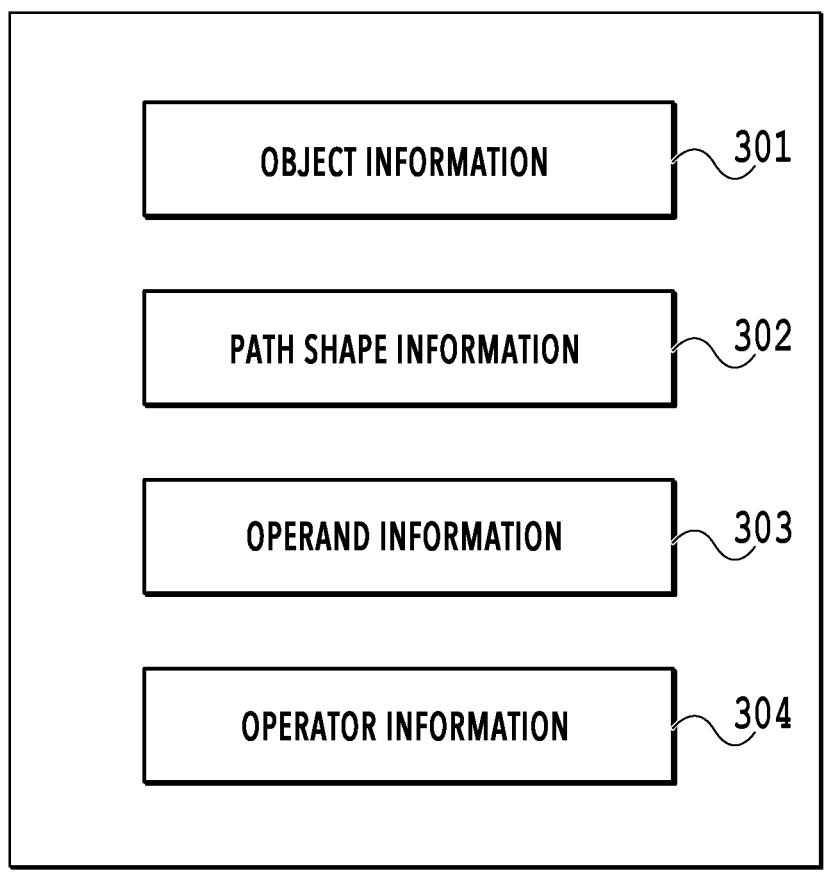
FIG. 3 is a diagram showing an example of the configuration of an object.

Here, the configuration of an object will be described. FIG. 3 is a diagram showing an example of the configuration of an object. Object information 301 is information indicating the object's attribute such as whether the object is an image object or a graphic object. Path shape information 302 is information on the object's position and outline such as information on the object's drawing range and path point sequence information expressing the object's outline with point sequences. Operand information 303 is information on the drawing such as the object's operand type (image, flat fill, etc.), color information, and color space (RGB, gray, etc.). Operator information 304 is information on the object's hierarchical level.

The description now returns to FIG. 2. A DL generation unit 203 generates a display list (DL) as intermediate data from each object. The DL generation unit 203 also analyzes the color information associated with the object and holds the analyzed color information. A specific-color conversion unit (hereinafter referred to as the first color conversion unit) 204 executes special color conversion for limited specific colors (hereinafter referred to as the specific-color conversion) in a case where the color information held in the DL generation unit 203 satisfies a predetermined condition. An all-color conversion unit (hereinafter referred to as the second color conversion unit) 205 executes all-color conversion, that is, color conversion using a gray scale conversion method (such as NTSC conversion) that collectively converts all color values into gray values, in a case where the color information held in the DL generation unit 203 does not satisfy the predetermined condition. An RIP processing unit 206 performs rendering (rasterization) on the DL generated by the DL generation unit 203. The structure of the DL will be described later with reference to FIG. 6.

Figure 4:
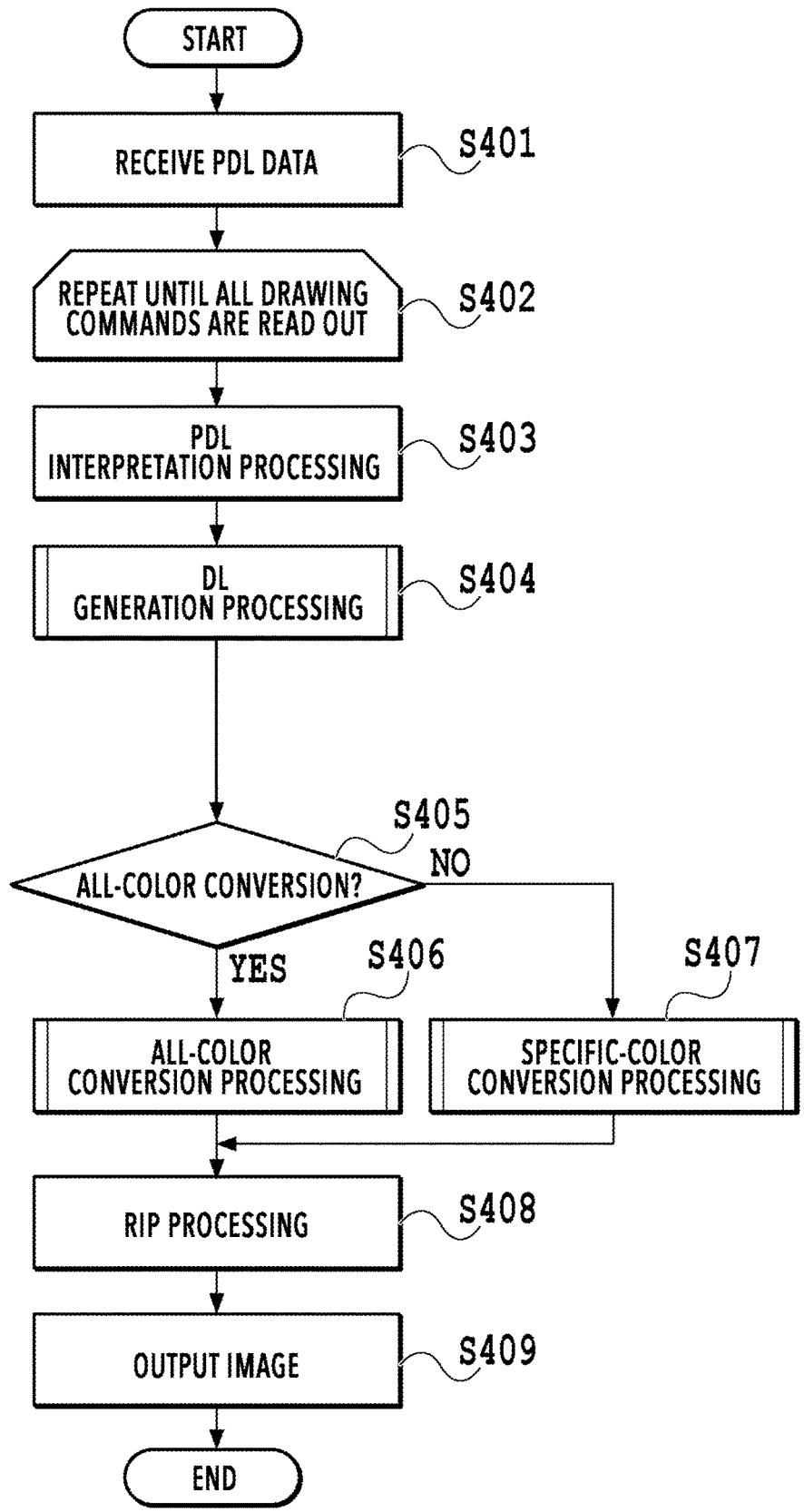
FIG. 4 is a flowchart showing the operation of the printing control apparatus according to the first embodiment.

Next, the operation of the printing control apparatus 100 will be described with reference to FIG. 4. FIG. 4 is a flowchart showing the operation of the printing control apparatus 100 according to the first embodiment. The CPU 101 performs the series of processes shown in the flowchart of FIG. 4 by deploying the program stored in the ROM 103 to the RAM 102 and executing it.

Upon receipt of PDL data from the network IF 104 (S401), the PDL reception unit 201 stores the PDL data in the RAM 102. Then, the processes in S403 and S404 are repeated for the drawing commands included in the PDL data stored in the RAM 102 (S402). In S403, the PDL interpretation unit 202 reads out a drawing command from the PDL data stored in the RAM 102, interprets the drawing command, and generates an object. In S404, the DL generation unit 203 generates a DL from the object generated in S403. The DL generation unit 203 also analyzes the color information associated with the object, and selects a color conversion method on the basis of the analyzed color information. In the present embodiment, the DL generation unit 203 selects the all-color conversion or the specific-color conversion as the color conversion method. The process by the DL generation unit 203 in S404 (DL generation processing) will be described later with reference to FIG. 5.

After the processes in S403 and S404 are completed for all drawing commands, the first color conversion unit 204 determines whether the all-color conversion has been selected in S404 (S405). If the all-color conversion has been selected (YES in S405), the second color conversion unit 205 executes all-color conversion processing on the DL generated by the processes in S402 to S404 (S406). Details of the all-color conversion will be described later with reference to FIG. 10. On the other hand, if the all-color conversion has not been selected (NO in S405), specific-color conversion processing is executed on the DL generated by the processes in S402 to S404 (S407). Details of the specific-color conversion processing will be described with reference to FIG. 8.

Then, the RIP processing unit 206 rasterizes the converted DL (S408). As a result, a rasterized image after the color conversion is generated. Note that the processes in S401 to S408 are executed on a page-by-page basis, and a rasterized image is generated for each page. Lastly, the CPU 101 performs necessary image processing on the generated rasterized image, and the engine 105 outputs the rasterized image after the image processing onto a print medium.

Figure 5:
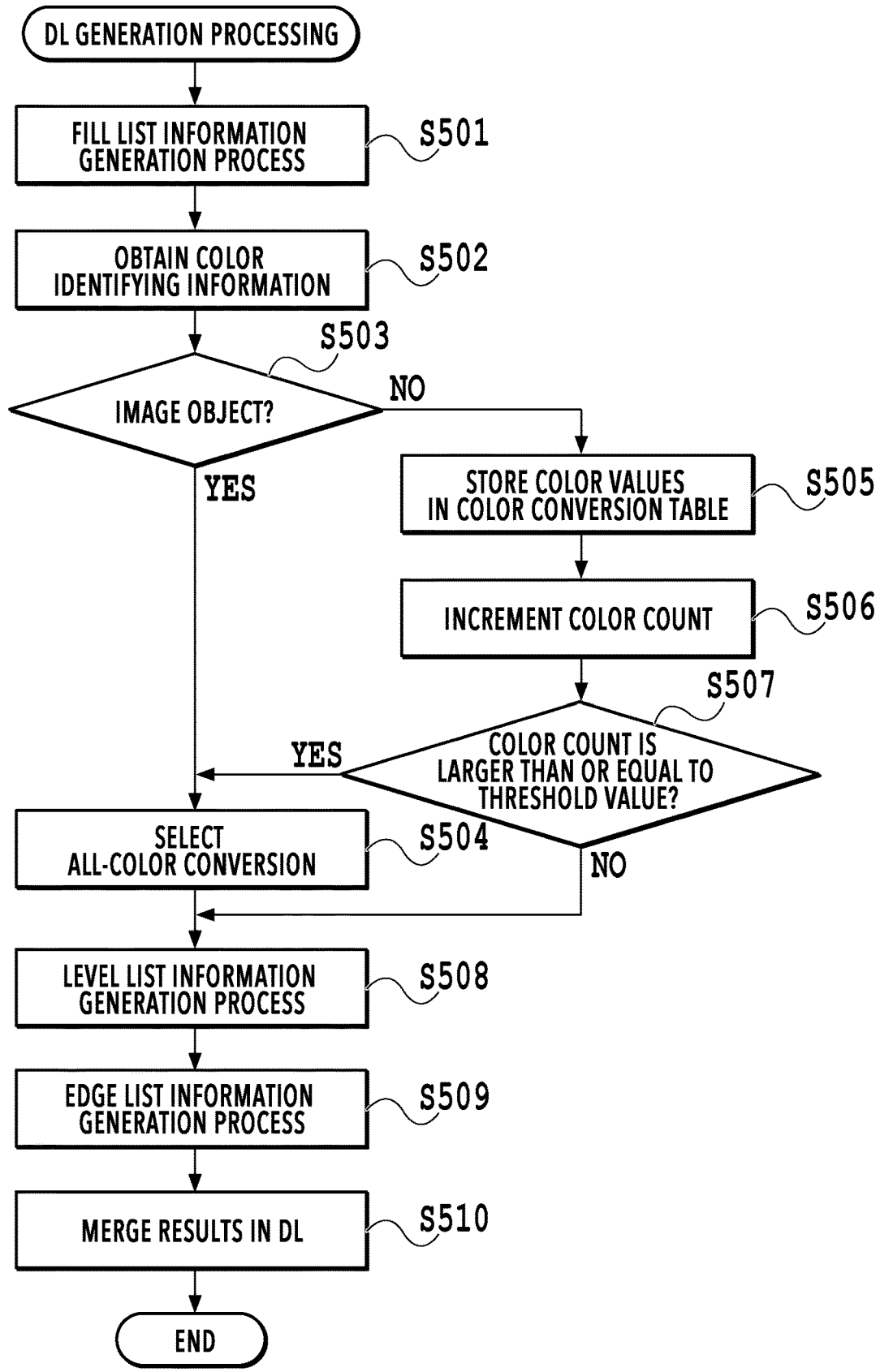
FIG. 5 is a flowchart showing DL generation processing in the first embodiment.
Figure 6:
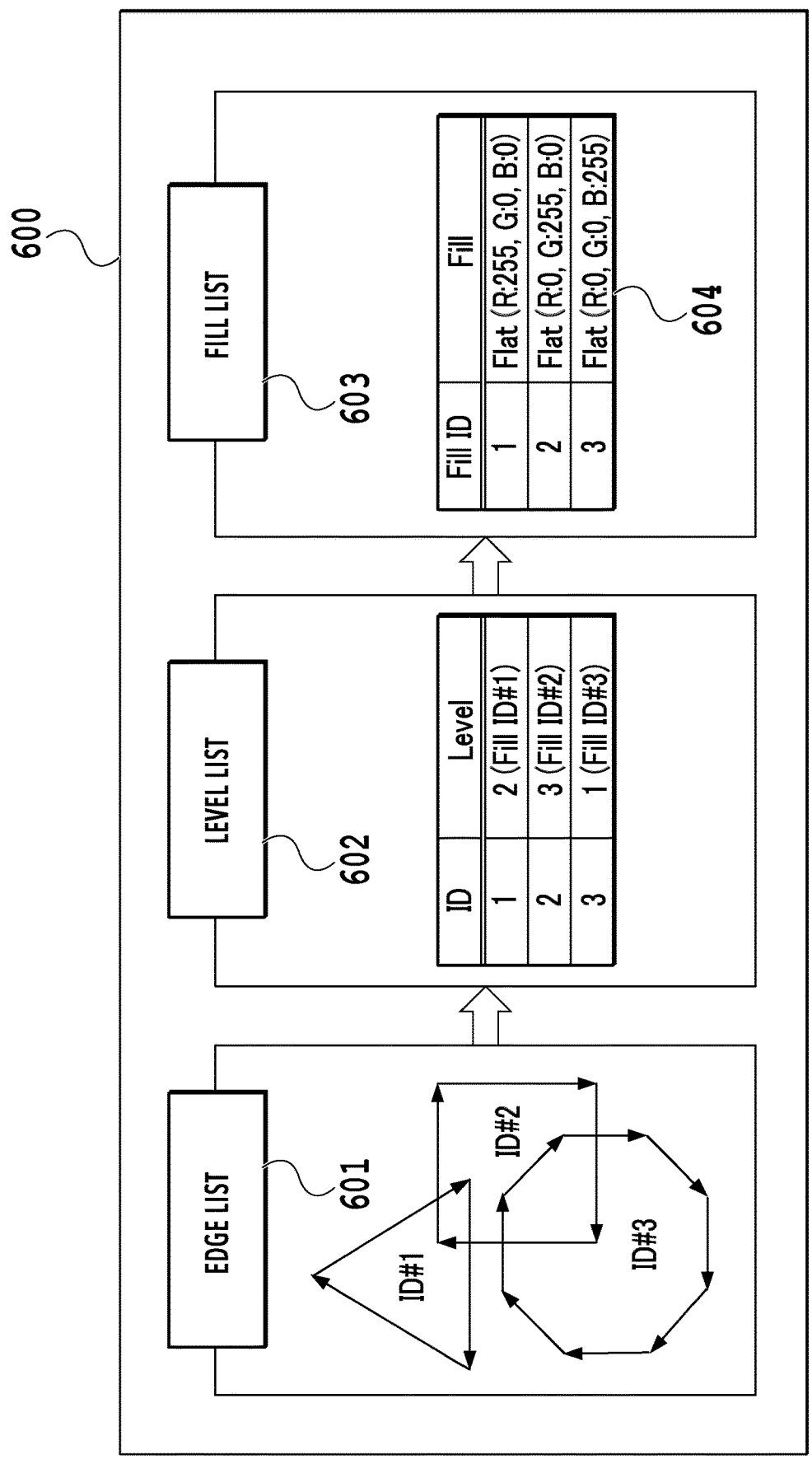
FIG. 6 is a diagram showing an example of the configuration of a DL.

Here, the DL generation processing in S404 will be described with reference to FIG. 5. As shown in FIG. 5, the DL generation unit 203 in the present embodiment executes a fill generation process, a level generation process, and an edge generation process in turn, and then merges the results of these processes in a DL. Meanwhile, in executing the fill generation process, the DL generation unit 203 executes a color information analysis process (the processes in S502 to S507 to be described later). Before describing the processes shown in FIG. 5, the structure of the DL generated in S404 will be described with reference to FIG. 6. FIG. 6 shows the structure of a DL in a simplified fashion. A DL 600 contains: edge list information 601 having a list structure based on the coordinates of start points of edges derived from the path shape information of objects; level list information 602 holding the upper or lower relation between the edges; and fill list information 603 holding the color information. In the DL generation processing, the DL generation unit 203 executes a process of generating the edge list information 601, the level list information 602, the fill list information 603 from each object and merging (combining) them in a DL.

The processes shown in FIG. 5 will be described. Firstly, the DL generation unit 203 generates the fill list information 603 from the operand information of an object (S501). The fill list information 603 stores information on the colors on and the pattern of the object. A used color table 604 is a table representing the fill list information in a simplified fashion, focusing only on the object type in the fill list information (image, flat fill, etc.) and the colors on the object. The example shown in FIG. 6 shows that the object type of the fill with ID (Fill ID) 1 is flat fill, meaning being colored uniformly in a single color, and that the object is colored in red. The example also shows that the fills with IDs 2 and 3 are likewise flat fills and that the objects are colored in green and blue, respectively. Note that information other than the information on the object types and the colors on the objects does not need to be described in the present embodiment, and is therefore omitted in the used color table 604.

Figure 7A:
FIGS. 7A and 7B are diagrams for explaining a color conversion table.
Figure 7B:

Then, the DL generation unit 203 obtains color identifying information and the color values therein (S502). Here, the attribute of the colored object, the number of colors, and so on are obtained as the color identifying information. Then, the DL generation unit 203 determines whether the obtained attribute of the object is image (S503). If the attribute of the object is image (YES in S503), the DL generation unit 203 can determine that the number of colors used is large, and therefore selects the all-color conversion (S504) and proceeds to the process in S508. Here, in a case where the all-color conversion has already been selected, the DL generation unit 203 proceeds to the process in S508 without executing any particular process. On the other hand, if the attribute of the object is not image (NO in S503), the DL generation unit 203 stores (registers) the color values obtained in S502 as unconverted color values in a color conversion table 700 shown in FIGS. 7A and 7B (S505). FIGS. 7A and 7B are diagrams for explaining the color conversion table. The color conversion table 700 is a table storing unconverted color values and converted color values in association with each other. In S505, the DL generation unit 203 generates a color conversion table in a case where no color conversion table has been generated. Also, in a case where any of the color values obtained in S502 has already been registered, the DL generation unit 203 does not register the same color value. If registering a new color value in the color conversion table 700 in S505, the DL generation unit 203 accordingly increments the count value of the number of colors registered in the color conversion table 700 (hereinafter referred to as the color count) (S506). The DL generation unit 203 holds the color count. Then, the DL generation unit 203 determines whether the color count is larger than or equal to a predetermined threshold value (S507). If the color count is larger than or equal to the predetermined threshold value (YES in S507), the DL generation unit 203 determines that the number of colors used is large, and selects the all-color conversion (S504) and proceeds to the process in S508. Here, in the case where the all-color conversion has already been selected, the DL generation unit 203 proceeds to the process in S508 without executing any particular process. On the other hand, if the color count is smaller than the predetermined threshold value (NO in S507), the DL generation unit 203 generates level list information from the operator information (S508). The level list information is information expressing the object arranged in the page in terms of a Z-order amount (a value in a Z direction perpendicular to an X direction and a Y direction). For example, the information may indicate that an object with level 2 is drawn over an object with level 1 (on the positive side in the Z direction). As a rule, the levels in the level list information are determined in the order in which the objects are to be processed with raster operation (ROP) information and so on in the operator information taken into consideration. As shown in FIG. 6, the level list information 602 is linked to the fill list information 603 generated in S501. Then, the DL generation unit 203 generates edge list information from the path shape information of the object (S509). As shown in FIG. 6, the edge list information 601 is linked to the level list information 602 generated in S508. The example shown in FIG. 6 shows that the level of the edges with ID 1 is 2, the level of the edges with ID 2 is 3, and the level of the edges with ID 3 is 1. In the following, an edge with ID n may also be expressed simply as ID #n. The DL generation unit 203 links the edge list information 601, the level list information 602, and the fill list information 603 thus generated to each other in the above-described manner to merge them in the DL 600 (S510). The DL generation processing is completed by repeating the processes in S501 to S510 for all objects. Note that when the DL generation processing is finished, the color conversion table 700 is in a state where only registered IDs and the unconverted color values are stored, as shown in FIG. 7A.

Figure 8:
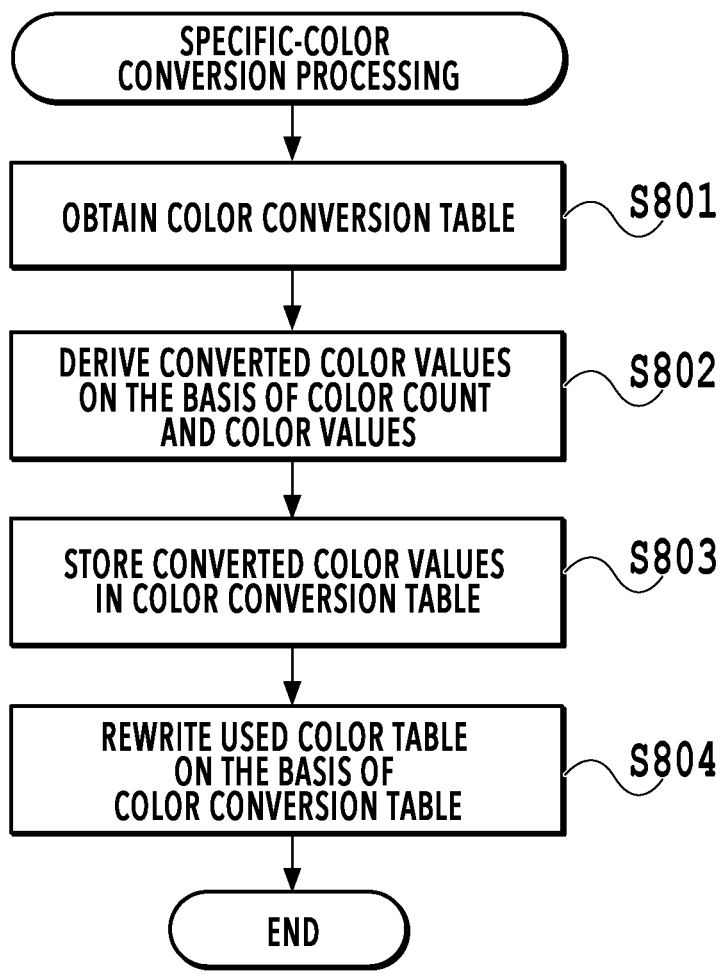
FIG. 8 is a flowchart showing specific-color conversion processing in the first embodiment.

Next, the specific-color conversion processing, performed by the first color conversion unit 204 in S407, will be described with reference to FIG. 8. FIG. 8 is a flowchart showing the specific-color conversion processing. Firstly, the first color conversion unit 204 obtains the generated color conversion table 700, shown in FIG. 7A, and the color count (S801). Then, the first color conversion unit 204 executes the specific-color conversion processing on the basis of the color count and the unconverted color values stored in the color conversion table 700 (S802). Assume, for example, that the unconverted color values are the values in the color conversion table 700 shown in FIG. 7A. In this specific-color conversion processing, for each unconverted color value, the first color conversion unit 204 firstly calculates a gray value by using a gray conversion method targeting all colors (such as NTSC conversion) to thereby derive the output density. Then, the first color conversion unit 204 arranges the color values in descending order of output density. In the example shown in FIG. 7A, the color values are arranged as ConvID #3>ConvID #1>ConvID #2. Note that ConvID #n denotes a color value with Convert ID n. Lastly, the first color conversion unit 204 determines converted color values according to the color count such that densities are allocated at equal intervals to the color values in ascending order of output density. Note that the method for the specific-color conversion is not limited to the above method. For example, densities may be allocated at equal intervals by using only the color count irrespective of the unconverted color values, or a different method may be used.

Figure 9:
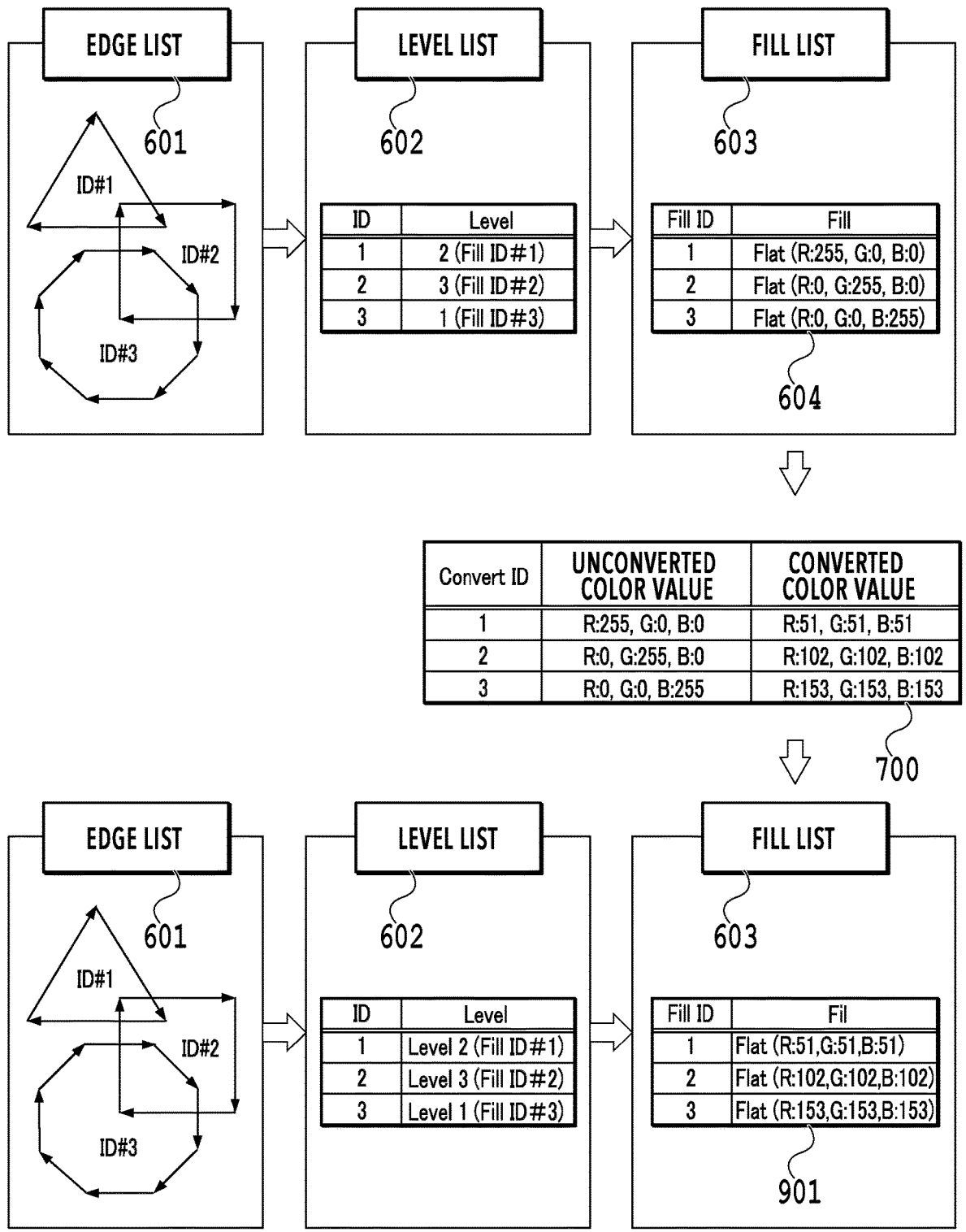
FIG. 9 is a diagram for explaining the process in S804.

After determining the converted color values, the first color conversion unit 204 stores the converted color values in the color conversion table 700 (S803). FIG. 7B shows an example of the color conversion table 700 with the converted color values stored therein. Then, the first color conversion unit 204 rewrites the used color table 604 generated in S501 by replacing the color values stored in the used color table 604 in accordance with the color conversion table 700 (S804). Here, the process in S804 will be described with reference to FIG. 9. Firstly, the first color conversion unit 204 obtains the used color table 604 generated in S501. Then, the first color conversion unit 204 searches the used color table 604 for a color value matching any of the unconverted color values in the color conversion table 700. If there is a color value matching any of the unconverted color values, the first color conversion unit 204 replaces that color value with the corresponding converted color value in the color conversion table 700. This process is repeated for all color values stored in the color conversion table. As a result, a replacement used color table 901 is completed, as shown in FIG. 9.

Figure 10:
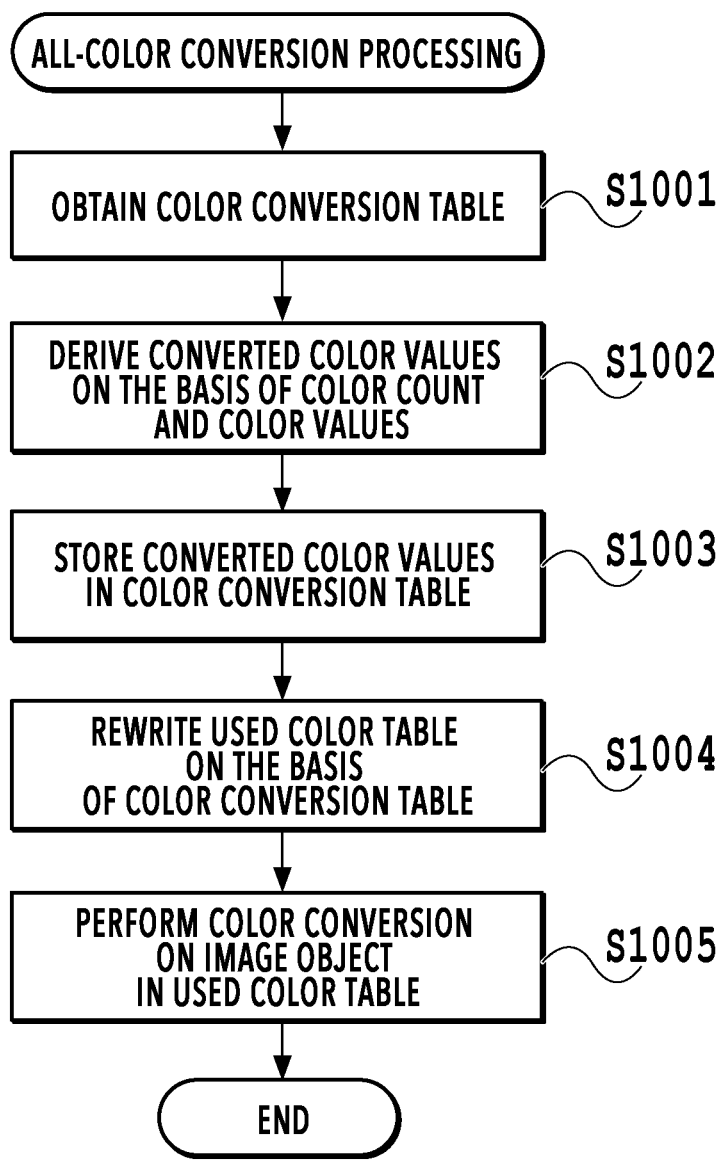
FIG. 10 is a flowchart showing all-color conversion processing in the first embodiment.

Next, the all-color conversion processing in S406, performed by the second color conversion unit 205, will be described with reference to FIG. 10. FIG. 10 is a flowchart showing the all-color conversion processing. Firstly, the second color conversion unit 205 obtains the generated color conversion table 700, shown in FIG. 7A (S1001). Then, the second color conversion unit 205 determines converted color values by converting the unconverted color values stored in the color conversion table 700 into gray values by a gray scale conversion method that collectively converts all color values into gray values (S1002). After determining the converted color values, the second color conversion unit 205 stores the converted color values in the color conversion table 700 (S1003). The process in S1004 is similar to S804, and description thereof is therefore omitted. Lastly, in a case where the used color table contains an image object, the second color conversion unit 205 executes gray conversion on the image object (S1005). This gray conversion is executed on the image object on a pixel-by-pixel basis. Meanwhile, in the present embodiment, the description has been given of a case where the color space of the color document is RGB. However, the color space may be a different color space such as CMYK.

As described above, in the present embodiment, in the case of executing color conversion after generating intermediate data, the used colors stored in the intermediate data are replaced before the execution of the RIP processing. In this way, the color conversion is performed efficiently as compared to a conventional method in which color replacement is performed pixel by pixel by referring to a color conversion table during RIP processing. Also, in the present embodiment, the converted color values are determined according to the number of colors such that densities are distributed at equal intervals to the color values in ascending order of output density. This improves the distinguishability in an output image obtained by outputting a color document in a gray scale format.

Also, in the execution of color conversion processing, image objects need color replacement on a pixel-by-pixel basis. Performing pixel replacement processing on the entire document as in the conventional method may possibly increase the processing load. On the other hand, in the present embodiment, pixel replacement processing is performed only on image objects. In other words, pixel-by-pixel color replacement processing is not performed on objects other than image objects. In this way, the processing load during color conversion processing is not increased more than necessary even in the case where the color document includes an image object.

Second Embodiment

The first embodiment has been described by taking as an example a printing control apparatus that generates intermediate data by analyzing PDL data and performs gray scale conversion on specific color values according to the result of the analysis of the PDL data. The present embodiment will be described by taking as an example a printing control apparatus that performs color conversion of specific color values into new color values according to the result of the analysis of the PDL data. Note that the configuration of the printing control apparatus in the second embodiment is similar to the configuration in the first embodiment shown in FIG. 1. In the following, the difference from the first embodiment will be described.

Figure 11:
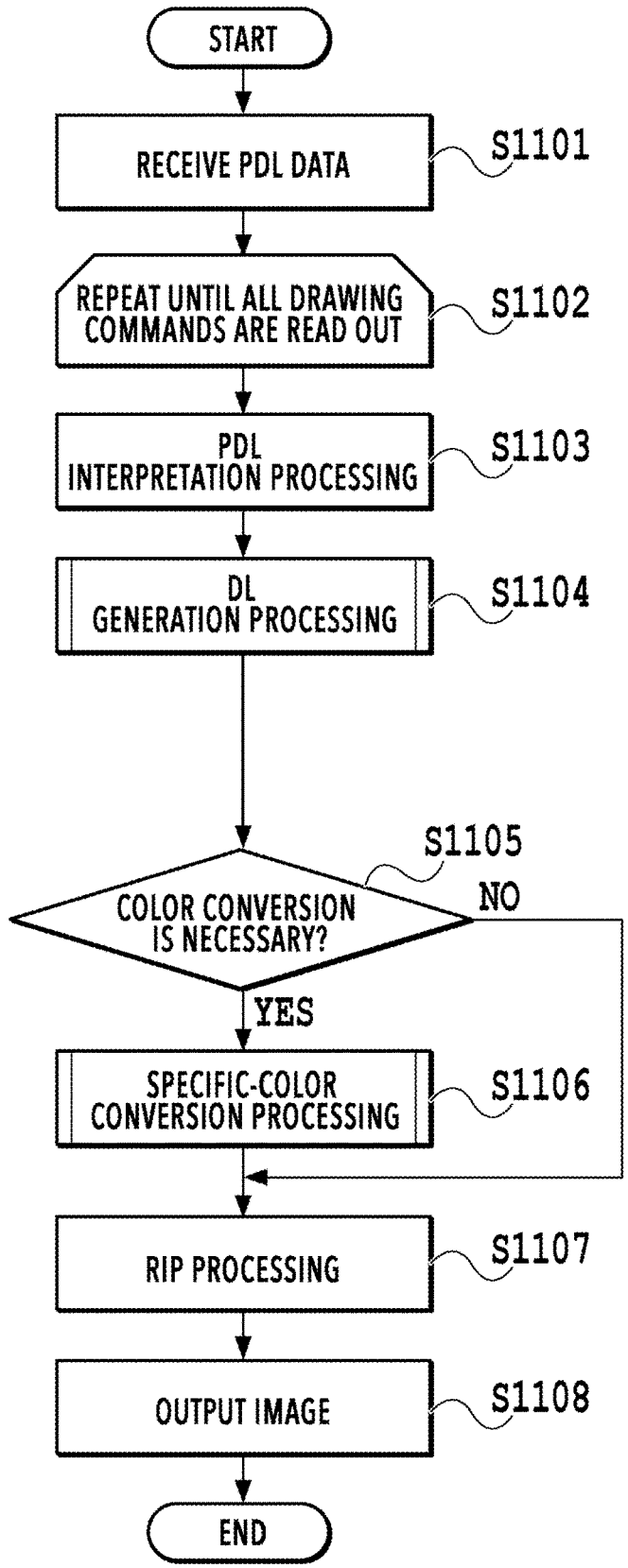
FIG. 11 is a flowchart showing the operation of a printing control apparatus according to a second embodiment.

FIG. 11 is a flowchart showing the operation of a printing control apparatus 100 according to the second embodiment. A CPU 101 performs the series of processes shown in FIG. 11 by executing a program stored in an ROM 103. The processes in S1101 to S1104 are similar to the processes in S401 to S404 in the first embodiment, except that in S1104 a DL generation unit 203 not only selects whether to execute specific-color conversion processing but also selects whether the color conversion is unnecessary. Details of the DL generation processing in S1104 will be described later with reference to FIG. 12.

After the processes in S1103 and S1104 are completed for all drawing commands, a first color conversion unit 204 determines whether the color conversion is necessary (S1105). If determining that the color conversion is not necessary (NO in S1105), the first color conversion unit 204 proceeds to the process in S1107 without executing the specific-color conversion processing. On the other hand, if determining that the specific-color conversion is necessary (YES in S1105), the first color conversion unit 204 executes specific-color conversion processing on the DL generated by the processes in S1102 to S1104 (S1106).

In this case, the first color conversion unit 204 executes processing similar to that in the first embodiment, i.e., the processing shown in FIG. 8. The processes in S1107 and S1108 are similar to the processes in S408 and S409 in the first embodiment, and description thereof is therefore omitted.

Figure 12:
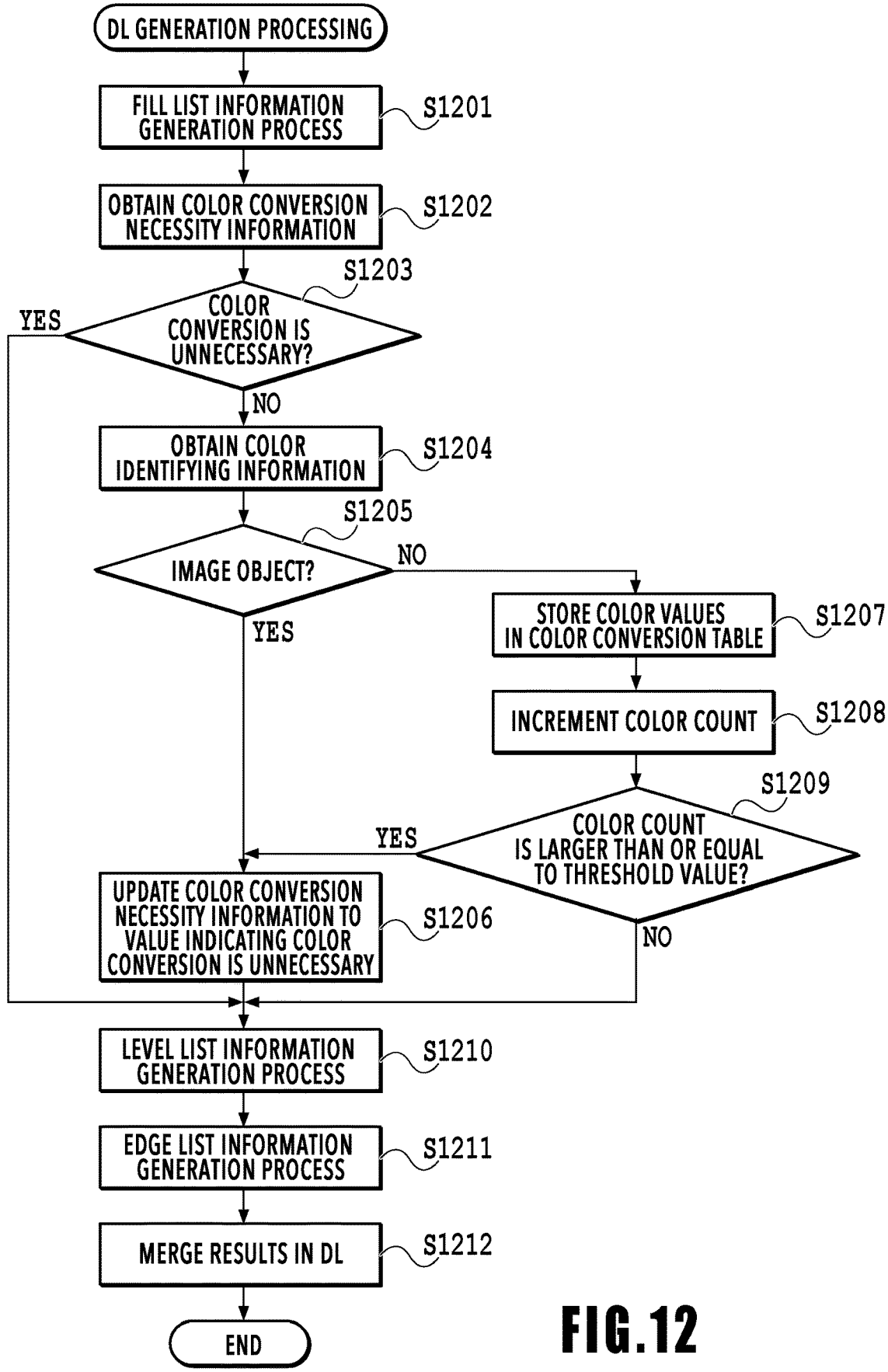
FIG. 12 is a flowchart showing DL generation processing in the second embodiment.

The DL generation processing in S1104 will be described with reference to FIG. 12. As shown in FIG. 12, in the present embodiment too, the DL generation unit 203 likewise executes a fill generation process, a level generation process, and an edge generation process in turn, and then merges the results of these processes in a DL. Meanwhile, in executing the fill generation process, the DL generation unit 203 executes a color information analysis process (the processes in S1204 to S1209 to be described later).

The processes shown in FIG. 12 will be described. The process in S1201 is similar to the process in S501 in the first embodiment. After S1201, the DL generation unit 203 obtains color conversion necessity information indicating whether the color conversion is necessary (S1202). The color conversion necessity information stores a value, as its initial value, indicating the color conversion is necessary. Then, from the color conversion necessity information, the DL generation unit 203 determines whether the color conversion is unnecessary (S1203). If the color conversion is unnecessary (YES in S1203), the DL generation unit 203 proceeds to the process in S1210. On the other hand, if the color conversion is necessary (NO in S1203), the DL generation unit 203 executes the processes in S1204 to S1209. The processes in S1204 and S1205 are similar to the processes in S502 and S503 in the first embodiment.

If determining in S1205 that the attribute of the object is image (YES in S1205), the DL generation unit 203 determines that the number of colors used is large, and updates the color conversion necessity information to a value indicating that the color conversion is unnecessary (S1206). The DL generation unit 203 then proceeds to the process in S1210. Here, in a case where there is a color conversion table 700 currently being created, the DL generation unit 203 deletes the color conversion table 700. On the other hand, if determining in S1205 that the attribute of the object is not image (NO in S1205), the DL generation unit 203 executes the processes in S1207 to S1209. The processes in S1207 to S1209 are similar to the processes in S505 to S507 in the first embodiment.

If determining in S1209 that the color count is larger than or equal to a predetermined threshold value (YES in S1209), the DL generation unit 203 updates the color conversion necessity information to the value indicating that the color conversion is unnecessary (S1206), and proceeds to the process in S1210. Here, in a case where there is a color conversion table 700 currently being created, the DL generation unit 203 deletes the color conversion table 700. On the other hand, if determining in S1209 that the color count is smaller than the predetermined threshold value (NO in S1209), the DL generation unit 203 proceeds to the process in S1210.

The processes in S1210 to S1212 are similar to the processes in S508 to S510. The DL generation processing is completed by repeating the processes in S1201 to S1212 for all objects. Note that a color conversion table 700 storing registered IDs and unconverted color values as shown in FIG. 7A is obtained in a case where the color conversion necessity information is not updated to the value indicating that color conversion is unnecessary after processing for all objects in S1206.

Next, the specific-color conversion processing performed by the first color conversion unit 204 in S1106 will be described. Note that the specific-color conversion processing in the present embodiment is similar to the specific-color conversion processing in the first embodiment. Meanwhile, in the first embodiment, an example where the first color conversion unit 204 converts color values into gray values has been discussed. The first color conversion unit 204 in the present embodiment converts unconverted color values into new color values by rearranging the combination of colors. For example, the first color conversion unit 204 in the present embodiment determines the converted color values by using a color universal design (CUD) conversion method that achieves a visually barrier-free condition by using a combination of colors perceivable by any individuals. Note that the method for the specific-color conversion is not limited to the above method, but a different method may be used.

As described above, in the present embodiment, in the case of executing color conversion after generating intermediate data, special color conversion such as CUD conversion is executed before the execution of the RIP processing. In this way, the color conversion is performed efficiently, as in the first embodiment. Also, in a case of outputting a color image, the distinguishability in the output image is improved.

Also, in the present embodiment, in the intermediate data generation processing, whether the color conversion is unnecessary is determined and, if it is determined that the color conversion is unnecessary, no color conversion is executed after the intermediate data is generated. Moreover, in the case where the color conversion is found unnecessary, the color information analysis process for the color conversion is not executed in the subsequent steps. Accordingly, the processing load is further reduced.

Note that the present embodiment has been described by taking RGB as an example of the color space of the color document. However, the color space may be a different color space such as CMYK.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-179264, filed Sep. 25, 2018, which is hereby incorporated by reference wherein in its entirety.

What is claimed is:

1. An image processing apparatus comprising:
one or more controllers, having one or more processors which execute instructions stored in one or more memories and/or one or more circuitries, being configured to:
generate intermediate data on a page-by-page basis by analyzing PDL data;
obtain color values of colors used in a page of the intermediate data;
count the number of the obtained colors;
determine achromatic color values respectively corresponding to the color values of colors used in the page based on the counted result;
generate intermediate data in which the obtained color values are rewritten to the determined achromatic color values; and
perform rendering based on the generated intermediate data.

2. The image processing apparatus according to claim 1, wherein
the one or more controllers are configured to:
generate a color conversion table based on a predetermined color conversion method; and
rewrite the obtained color values by using the color conversion table,
wherein the color conversion table is a table in which the color values of the colors used in the page and color values determined by converting the color values of the colors used in the page by the predetermined color conversion method are stored in association with each other.

3. The image processing apparatus according to claim 2, wherein the one or more controllers are configured to select the predetermined color conversion method to be used to generate the color conversion table according to the number of colors used in the page.

4. The image processing apparatus according to claim 2, wherein the one or more controllers are configured to, in a case where the number of colors used in the page is smaller than a predetermined threshold value, select, as the predetermined color conversion method, a first color conversion method that converts the color values of the colors used in the page into gray values such that densities are distributed at equal intervals to the colors in ascending order of density.

5. The image processing apparatus according to claim 2, wherein the one or more controllers are configured to, in a case where the number of colors used in the page is larger than or equal to a predetermined threshold value, select, as the predetermined color conversion method, a second color conversion method that collectively converts all color values into gray values.

6. The image processing apparatus according to claim 5, wherein the one or more controllers are configured to, even in a case where the number of colors used in the page is smaller than the predetermined threshold value, select the second color conversion method as the predetermined color conversion method if an image object is contained in the page.

7. The image processing apparatus according to claim 6, wherein the one or more controllers are configured to, in the case where an image object is contained in the page, generate the color conversion table based on the second color conversion method for colors to be used to draw an object other than the image object.

8. The image processing apparatus according to claim 2, wherein the one or more controllers are configured to select a color conversion method employing a color universal design (CUD) as the predetermined color conversion method.

9. The image processing apparatus according to claim 8, wherein the one or more controllers are configured to:
determine that no color conversion is necessary in a case where the number of colors used in the page is larger than or equal to the predetermined threshold value or in a case where an image object is contained in the page; and
in a case where the one or more controllers determine that no color conversion is necessary, not rewrite the obtained color values and perform rendering based on the intermediate data generated by analyzing the PDL data.

10. An image processing method comprising:
generating intermediate data on a page-by-page basis by analyzing PDL data;
obtaining color values of colors used in a page of the intermediate data;
counting the number of the obtained colors;
determining achromatic color values respectively corresponding to the color values of colors used in the page based on the counted result;
generating intermediate data in which the obtained color values are rewritten to the determined achromatic color values; and
performing rendering based on the generated intermediate data.

11. A non-transitory computer readable storage medium storing a program which causes a computer to perform an image processing method, the image processing method comprising:
generating intermediate data on a page-by-page basis by analyzing PDL data;
obtaining color values of colors used in a page of the intermediate data;
counting the number of the obtained colors;
determining achromatic color values respectively corresponding to the color values of colors used in the page based on the counted result;
generating intermediate data in which the obtained color values are rewritten to the determined achromatic color values; and
performing rendering based on the generated intermediate data.

* * * * *